United States Patent
Seeger et al.

(10) Patent No.: US 8,156,469 B2
(45) Date of Patent: Apr. 10, 2012

(54) SINGLE COMPOSITION OF PATTERN MODULES

(75) Inventors: Frank Seeger, Wiesloch (DE); Frank Stienhans, Mannheim (DE); Holger Koser, Bad Schonborn (DE)

(73) Assignee: SAP AG, Walldorf (DE)

( * ) Notice: Subject to any disclaimer, the term of this patent is extended or adjusted under 35 U.S.C. 154(b) by 1489 days.

(21) Appl. No.: 11/323,396

(22) Filed: Dec. 29, 2005

(65) Prior Publication Data

US 2007/0157179 A1 Jul. 5, 2007

(51) Int. Cl.
 G06F 9/44 (2006.01)
(52) U.S. Cl. ........................................ 717/107
(58) Field of Classification Search ........... 717/101–107
 See application file for complete search history.

(56) References Cited

U.S. PATENT DOCUMENTS

| | | | |
|---|---|---|---|
| 2001/0003191 A1* | 6/2001 | Kovacs et al. | 709/226 |
| 2006/0004845 A1* | 1/2006 | Kristiansen et al. | 707/103 R |
| 2006/0036479 A1* | 2/2006 | Whitmore | 705/10 |
| 2006/0106626 A1* | 5/2006 | Jeng et al. | 705/1 |
| 2006/0206890 A1* | 9/2006 | Shenfield et al. | 717/174 |
| 2006/0294112 A1* | 12/2006 | Mandato et al. | 707/100 |
| 2007/0089050 A1* | 4/2007 | Vignet | 715/509 |

* cited by examiner

*Primary Examiner* — Anna Deng
(74) *Attorney, Agent, or Firm* — Mintz Levin Cohn Ferris Glovsky and Popeo, P.C.

(57) ABSTRACT

A computer-implemented method, system, and computer program product for generating an application based on a selection of one or more application patterns. A model of an operation of the application is generated. A design time application component to provide content for the model is provided, as well as a runtime application component to execute the operation associated with the model based with the content. The model, design time application component, and runtime application component are linked together to form a pattern module, the pattern module being an executable and portable operation of the application.

16 Claims, 7 Drawing Sheets

SINGLE COMPOSITION OF PATTERN MODULES

BACKGROUND

This document relates to data processing by digital computer in a visual modeling language environment, and more particularly to generating a pattern-based application in a visual modeling environment.

Application programs, sometimes referred to simply as applications, are programs that an end-user runs to accomplish certain tasks. Applications typically work in conjunction with one or more back-end systems, which store the data to be worked on (e.g., business objects and other business data), as well as logic for manipulating the data (e.g., transactions or other business logic). Examples of back-end systems include database systems, enterprise resource planning (ERP) systems, and customer relationship management (CRM) systems. A user interface (UI) is designed to work in concert with application programs, and facilitates interaction between humans and computers by inviting and responding to user input.

Traditional techniques for creating applications involved extensive programming using a specific and complex programming language, which could only be done by an expert of such programming language. New, visual modeling tools such as the Visual Composer tool by SAP AG of Walldorf Germany simplify the creation and management of applications by providing graphical patterns that can connected together to automatically generate code represented by the graphical patterns. However, even visual modeling tools make it difficult to manage, modify, and propagate modifications to applications that are created and run on multiple client systems.

The visual modeling tool enables a business expert to create applications in a modeling environment in a declarative, problem centric, code free way. Experience showed that for certain reasons this is best done in a clear defined and restricted application domain. However, the more restricted such a domain, the less abstract the modeling environment. An application domain is characterized by a set of requirements that are realized by the applications of the domain. Unfortunately, such a restricted environment will not persist for long, but will change according to new or modified requirements. Accordingly, what is needed is a model based development environment which can smoothly be aligned with new and changing requirements.

SUMMARY

This document discloses a computer-implemented method, system and computer program product for generating an application based on a selection of one or more application patterns. According to one aspect, a method includes generating a model of an operation of the application, and providing a design time application component to provide content for the model. The method further includes providing a runtime application component to execute the operation associated with the model based with the content. According to another aspect, a method includes linking the model, design time application component, and runtime application component to form a pattern module, the pattern module including portable and executable parts of the application.

According to another aspect, a computer program product, tangibly embodied in an information carrier, is operable to cause a data processing apparatus to generate a model of an operation of the application, provide a design time application component to provide content for the model, and provide a runtime application component to execute the operation associated with the model based with the content. The computer program product is further operable to cause the data processing apparatus to link the model, design time application component, and runtime application component to form a pattern module, the pattern module being an executable and portable operation of the application.

According to yet another aspect, a system for generating an application based on a selection of one or more application patterns includes a pattern module. The pattern module includes a model of an operation of the application, a design time application component to provide content for the model, and a runtime application component to execute the operation associated with the model based with the content. The system further includes a visual modeling tool to generate a visual representation window, the visual representation window to display a graphical representation of the pattern module.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
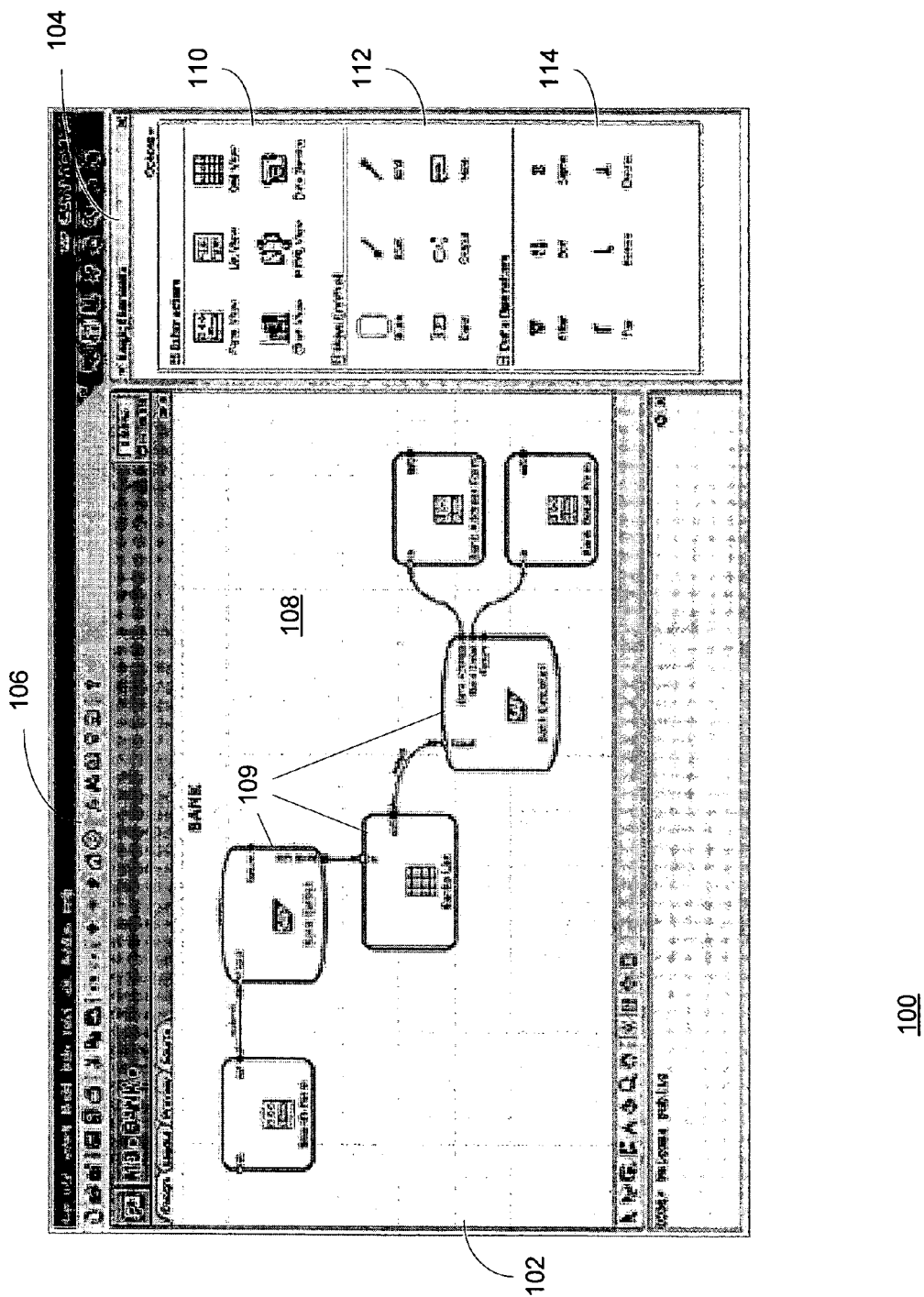
FIG. 1 is a screen shot of a visual modeling tool according to an embodiment.

FIG. 1 is a screen shot of a visual modeling tool 100 for code-free creation of composite applications. The visual modeling tool 100 is platform-independent, as well as independent of any technology or programming language. The visual modeling tool 100 is preferably a web-based, rich-client presentation layer application in a client/server computer architecture. The visual modeling tool 100 includes a visual representation window 102, also known as a "storyboard," a palette 104 of selectable logic elements, and at least one control interface 106 such as a control or command bar. The visual representation window 102 displays a graphical representation of an application 108, or portion thereof.

The application 108 includes application logic and process flows as represented by a number of application objects 109. Each application object 109 can represent a functional step in a logical process or a data flow, and include one or more inputs and one or more outputs. Each application object 109 acts as a model for the execution, testing, simulation, debugging and document creation related to the application 108. A view of the visual modeling tool 100 can be configured to show only a high-level functional view of the application 108 and hide the details, however the view can be adjusted, particularly within each application object 109, so that increasing levels of detail (to the code level) can be viewed in the visual representation window 102.

The selectable logic elements displayed in the palette 104 can include interactors 110 that modify the view of the visual representation window 102, flow control objects 112 that provide a directive of data flow, and data operators 114 that define an operation to be executed on data within each application object 106. The selectable logic elements can be "dragged" from the palette and "dropped" into the visual representation window 102. The visual modeling tool 100 can also include property editors, design assistants, drawing tools, an interaction manager, and a code generator that generates code based on the high-level functional view of the application 108.

The application 108 can be formed, or composed, by establishing relationships 104 between the application objects 109, and to generate a graphical representation of the application 108. The visual modeling tool 100 provides modifiability (composition, decomposition, and recomposition) of an application 108 through visual programming. The composition capabilities of the visual modeling tool 100 are an integral part of the visual modeling tool 100 itself and based on a component concept which is shared with the runtime environment. The elements of composition are defined by the pattern modules. The modeling tool also provides a diagram language used to visualize the composition elements. The graphical representation of the application 108 can lead to automatic code generation if the runtime parts are realized as generators/compilers and not interpreters. Once modeled in the storyboard, an application 108 can be run everywhere irrespective of platform or programming language. Variations can be made to a modeled application 108, while usability and portability is preserved. Changes to the model can be recomputed by the visual modeling tool 100, and propagated to as many versions of an application 108 as desired. In an exemplary embodiment, a composed application is associated with a unique uniform resource locator (URL) that can be accessed by any client computer using any browser, for runtime execution of the application 108.

Figure 2:
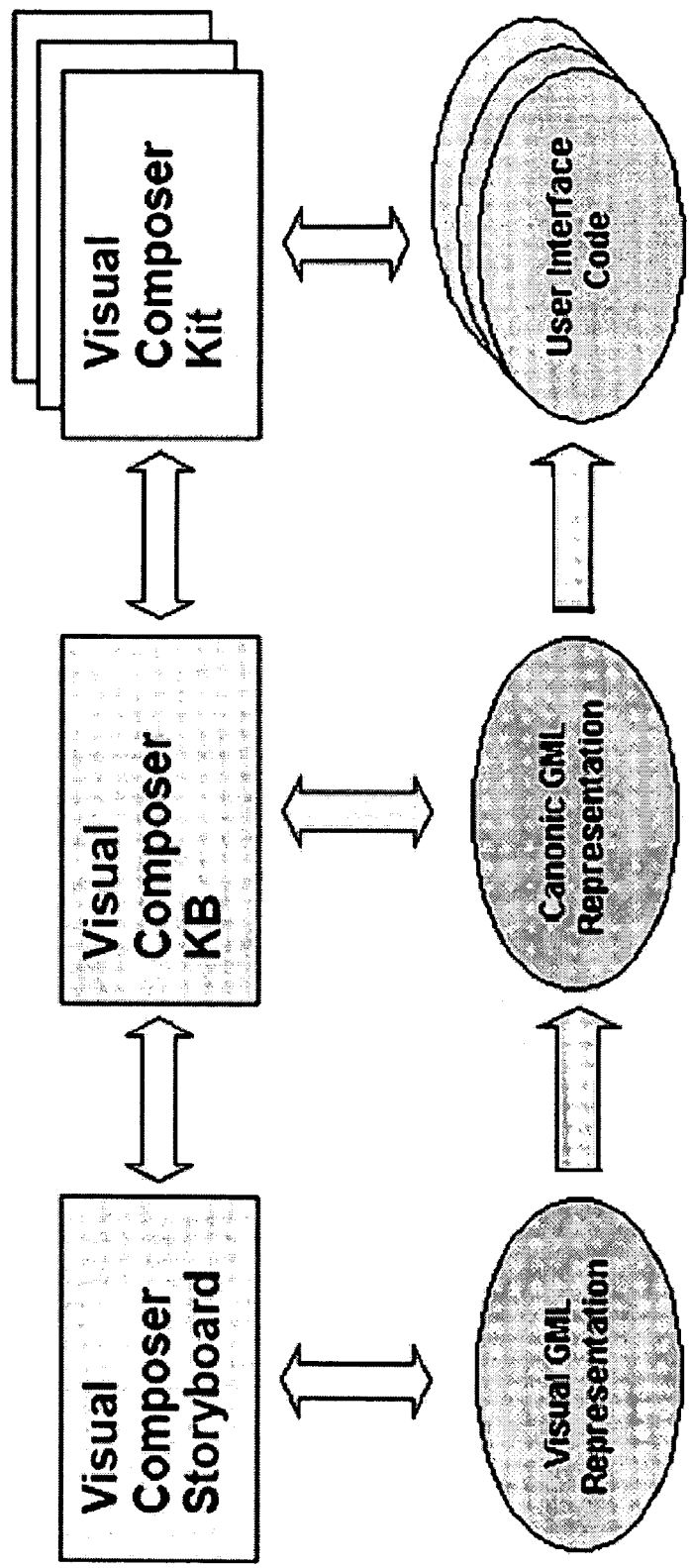
FIG. 2 illustrates the operation of a storyboard of a visual modeling tool that is used to draw and compose model diagrams.

In an exemplary embodiment, the visual modeling tool 100 is similar to the Visual Composer Modeling System developed by SAP AG of Walldorf Germany, as part of their Netweaver platform for business intelligence and analytics. The visual modeling tool 100 can utilize a visual modeling language, such as the GUI Machine Modeling Language (GML) to implement the storyboard. As illustrated in FIG. 2, the storyboard is used to draw and compose model diagrams using a simple and intuitive visual notation, and user interactions such as "drag and drop" operations of application objects. The model is stored in a knowledge base using a machine-readable modeling language, and a number of pre-built graphical modeling kits enable automatic code generation without any programming by a developer.

Figure 3:
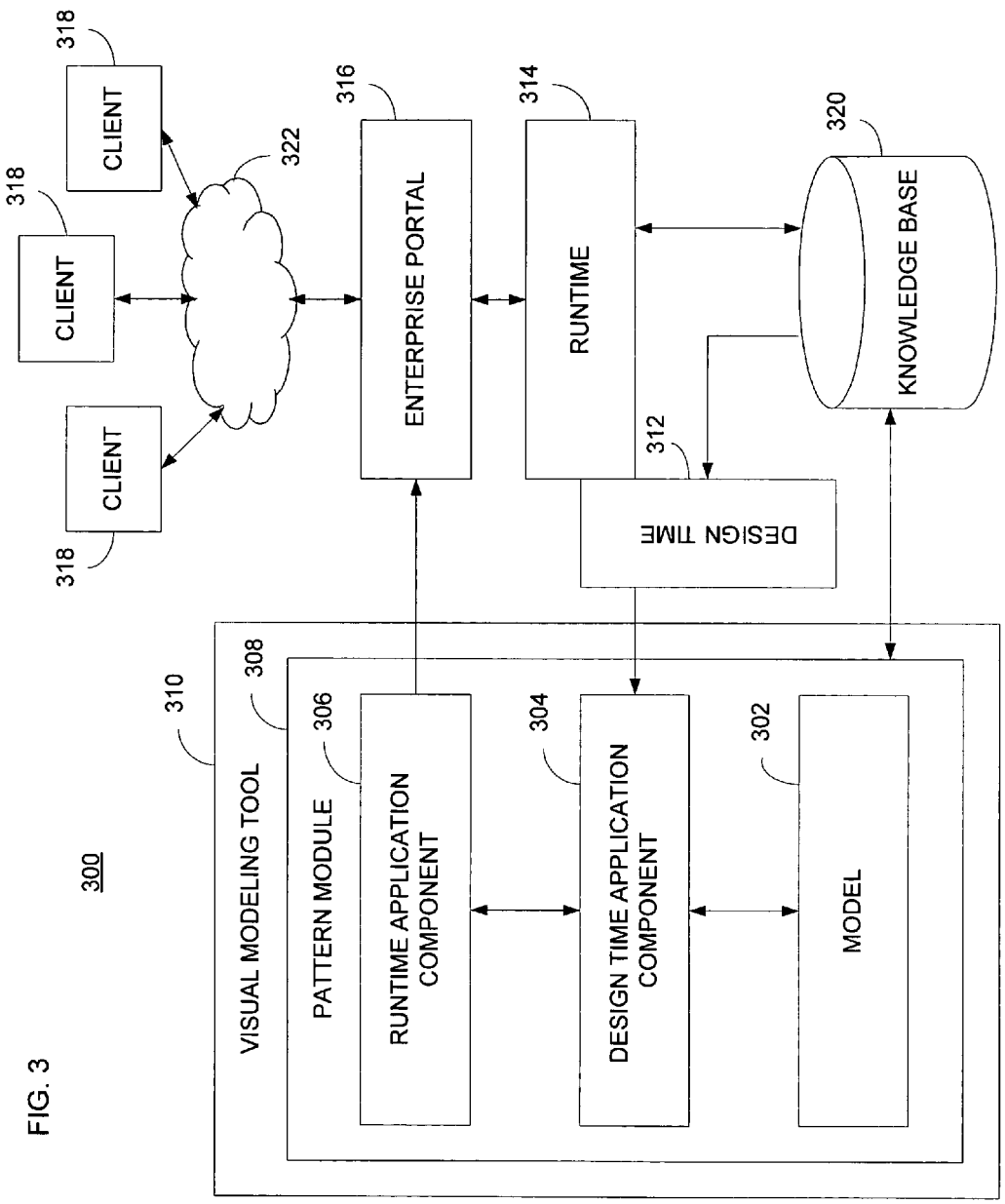
FIG. 3 illustrates a model-driven architecture (MDA) of an application generation system.

FIG. 3 illustrates a model-driven architecture of an application generation system 300, in which models 302 are used by a virtual modeling tool 310 to generate code and as a baseline configuration for future modifications. In some embodiments of a model-driven architecture, an application consists a model 302, a design time application component 304 to provide content for the model, and a runtime application component 306 to execute the model 302 with the content provided by the design time component 304.

The model 302 represents the basic functional and operational data flow and layout of an application, i.e. an application pattern that can be centrally defined and delivered to an enterprise for customization. The design time application component 304 includes data content, user interface logic of the application specified by the model 302. The design time application component 304 uses data content from a knowledge base 320 (e.g. database, infocube, etc.) accessed through a design time application and connectivity module 312. The runtime application component 306 is a platform-independent execution engine that runs the logic of the application specified in the design time application component 304. The runtime application component 306 executes the application and data content from the knowledge base 320 through a runtime application and connectivity module 314. The design time application and connectivity module 312 and runtime application and connectivity module 314 can run in a server arrangement.

The model 302, design time application component 304 and runtime application component 306 can be linked together to form a pattern module 308. The pattern module 308 is an executable file that can be stored in a knowledge base as a single unitary object. Accordingly, if changes need to be made to the model 302, each component of the pattern module 308 need not be decomposed, rather the changes are propagated throughout the design time application component 304 and the runtime application component 306 as well. The pattern module 308 can also be exported via an enterprise portal 316 and delivered to client systems 318 via a communications network 322, such as the Internet, to include a wireless communication network, broadband communication network, or other interactive communication medium.

Each composition of the model 302, design time application component 304 and runtime application component 306 can be used to compose an overall model, design time application, and runtime application for a web-based application system. Accordingly, the pattern module 308 simplifies modifications to, distribution (e.g. portability), and execution of applications created using a visual modeling tool.

Figure 4:
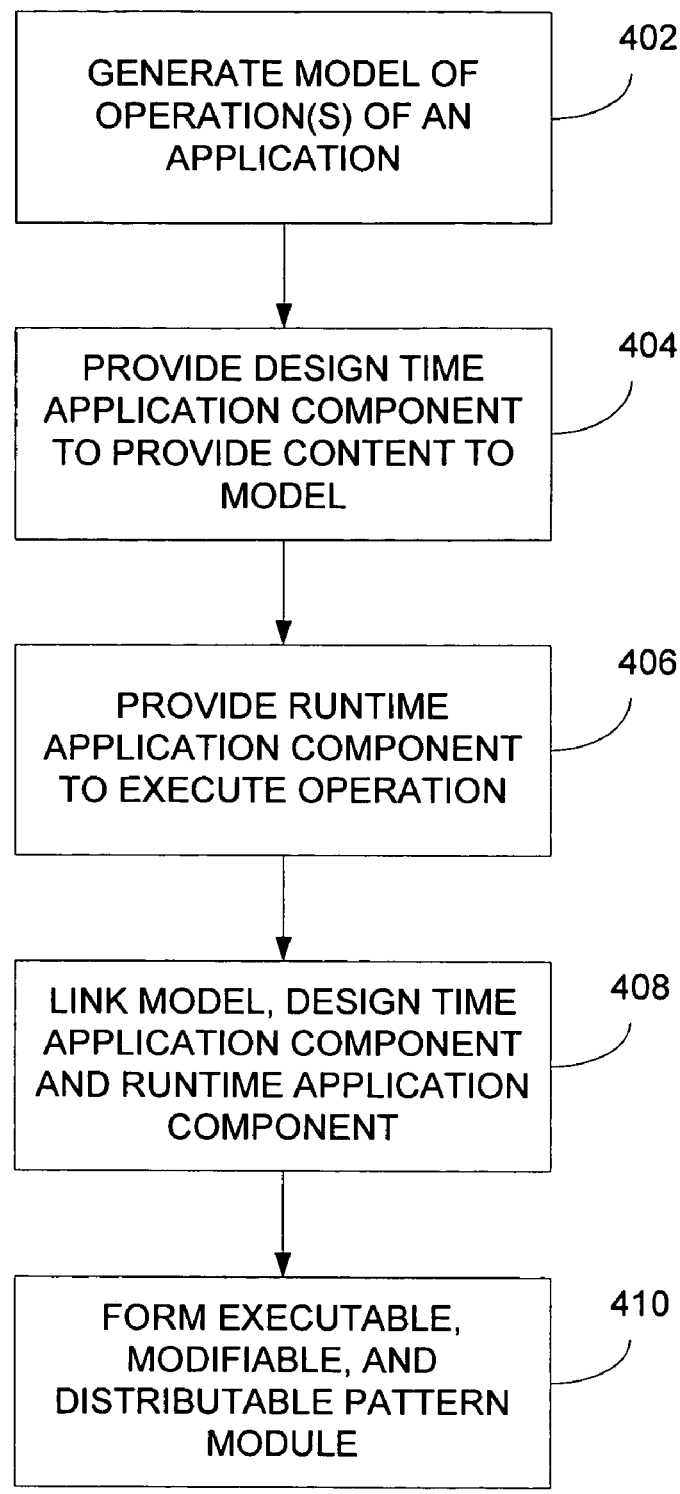
FIG. 4 is a flowchart of a method 400 for creating a pattern-based application.

FIG. 4 is a flowchart of a method 400 for creating a pattern-based application. At 402, a model of one or more operations of an application is generated. The model represents a high-level abstraction of a pattern, which can be all or a portion of the application. At 404, a design time application component is provided to supply content to the model. At 406, a runtime application component is provided to execute the model based on the content supplied by the design time application component. At 408, the model, the design time application component, and the runtime application component are linked, to form, at 410 a pattern module. The pattern module can be distributed and executed among heterogeneous client systems within an enterprise, yet modifiable at the design source such that modifications are easily propagated throughout the pattern module.

Figure 5:
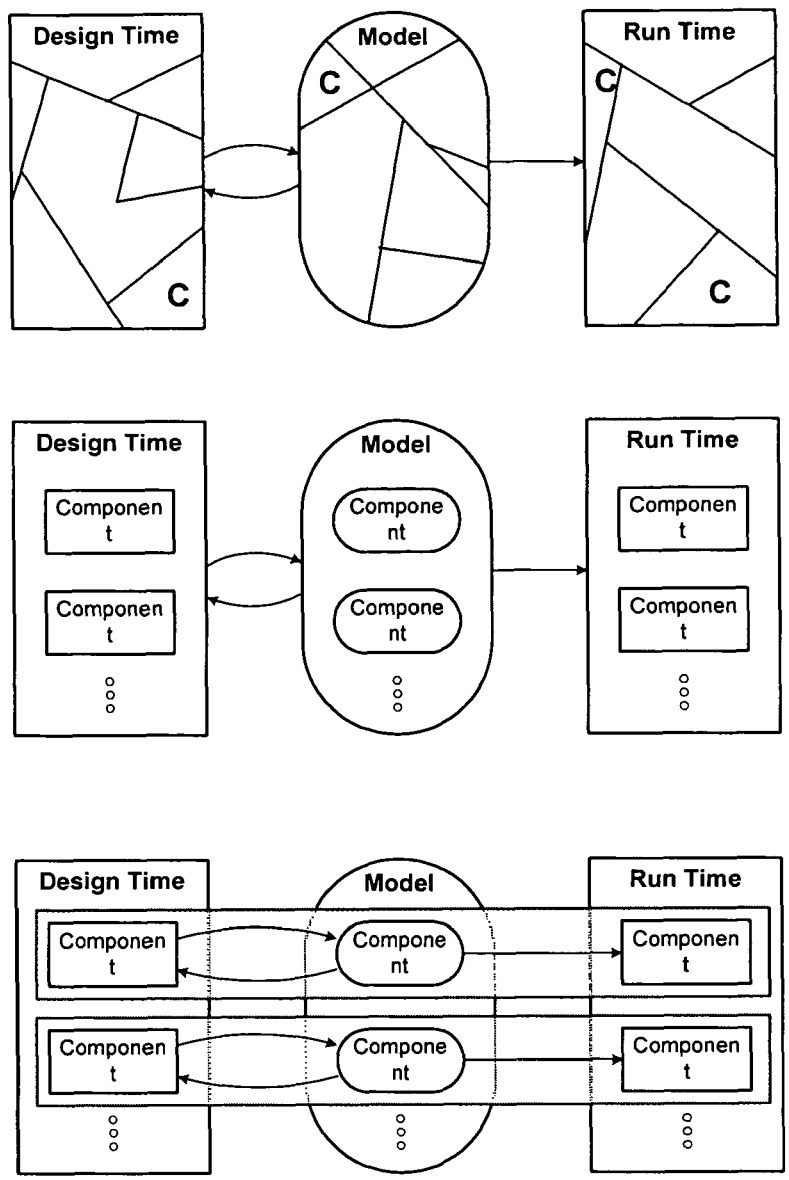
FIG. 5 shows an approach of single composition in an MDA environment.
Figure 5:
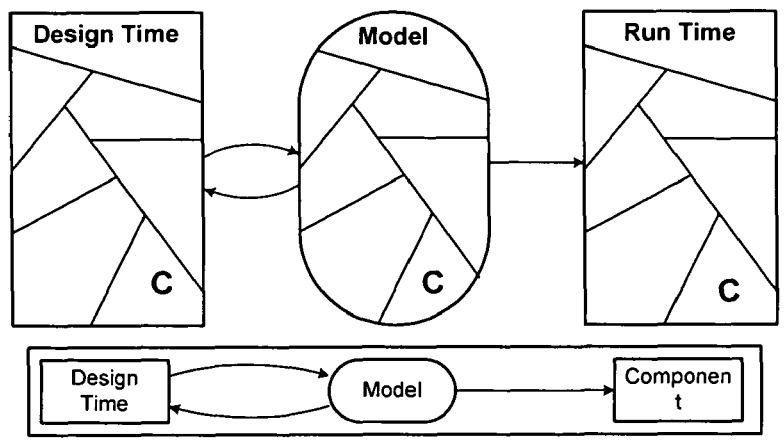
Figure 6:
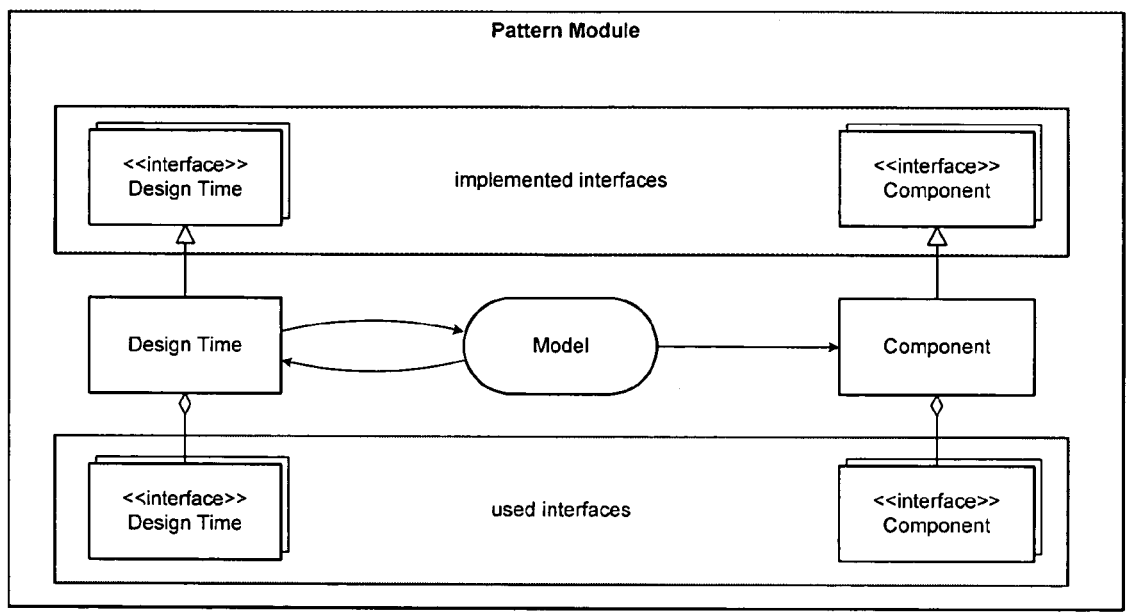
FIG. 6 shows details of a pattern module.
Figure 7:
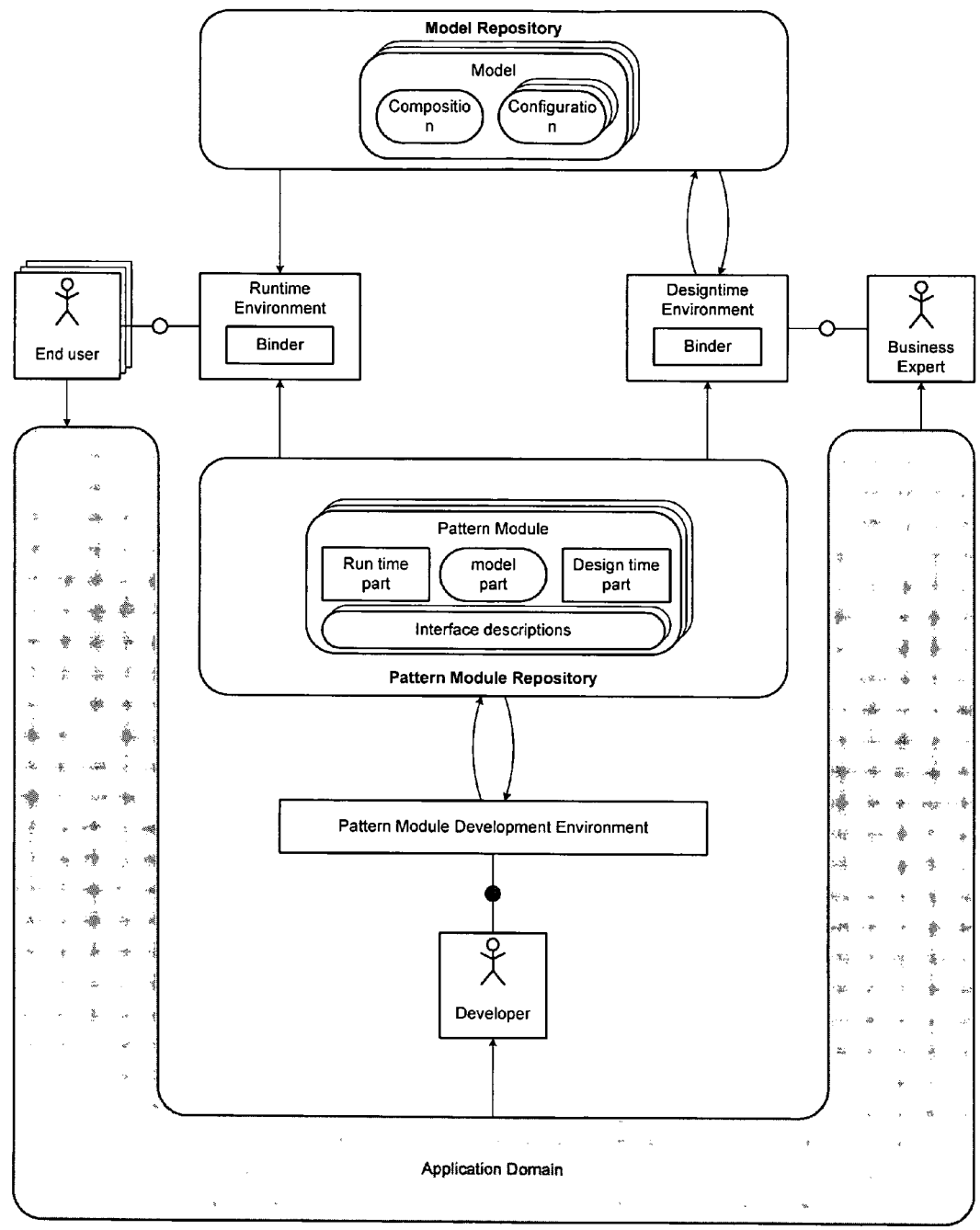
FIG. 7 shows an overall system based on a modularized MDA technology.

With reference to FIGS. 5-7 the use of a pattern module in a model driven architecture is shown. With specific reference to FIG. 7, a development system includes three different roles: the end user(s) running the applications, the business expert modeling the applications, and a developer providing pattern modules developed or modified for specific requirements. The requirements are created by the end users and are taken into account by the business experts and developers. The application domain and the requirements do not exist on a physical basis.

The development system has two repositories, a pattern module repository for storing the pattern modules and their meta descriptions, and a model repository for storing the models that are created by the business expert. The end user executes the models. A model as created by the business expert has two different types of content: a composition and a set of configurations. The composition is basically a graph where each node refers to a configuration and to a pattern module.

A pattern module contains three parts: a design time part which is an executable entity in a certain design time environment, a runtime part which is an executable entity in a certain runtime environment, and a model which is the metamodel of a configuration of a composition node pointing to this pattern module. Additionally, a pattern module contains a set of interface descriptions, as illustrated in FIG. 5, defining how the parts of different modules can be combined/composed. The composition capabilities on parts defined by their interfaces define, in a canonical manner, composition capabilities of pattern modules. Two pattern modules can be combined if, and only if, their parts can be combined according to their interfaces.

A business expert composing an application is running a visual modeling tool such as Visual Composer can plug in design time parts from pattern modules located in the pattern module repository. The design time parts actually used are defined by the composition created by the business expert. A particular design time part enables the business expert to configure/model a particular part of an application. A new application parts can be created by composition. The design time environment uses the meta information of the pattern module to determine which other modules can be attached to the current pattern module. If a certain application part supported by a particular pattern module is selected, the environment loads the design time part of the pattern module in order to support configuration of this application part.

When the end user executes such a model, the runtime environment first loads the composition and, for any part of the application that is actually in use, loads the runtime part of the pattern module referred to in the composition. The runtime part that has been loaded for a node in the composition graph will execute the configuration attached to the node in the composition which refers to the pattern module from which the runtime was loaded.

This mechanism is based on "single composition" i.e. the same composition is used to compose the model content, which is the composition of all configurations. The composition is used to compose the model (or meta model of the content) by composing the model parts of the pattern modules referred to by each composition node. Accordingly, the composition is used to compose the total design time by composing the design time parts, etc.

Since the parts of the pattern modules depend on the interfaces they use and implement, new pattern modules can be added to the overall system without modifying existing ones. If certain requirements of an application cannot be realized with a given set of pattern modules, new pattern modules can be developed and deployed to the pattern module repository. This allows modifying the application domain while still providing a restrictive model based on the modules chosen in an actual composition.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to knowledge base architectures that include a relational database; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A computer-implemented method of generating an application based on a selection of one or more application patterns, the method comprising:
    generating a graphical representation of a model to represent a basic functional and operational data flow of the application in a storyboard of a visual modeling tool;
    providing a design time application component to provide data content and user interface logic of the application specified for the model, wherein the design time application component uses the data content from a knowledge base accessed through a design time environment;
    providing a runtime application component to execute the data content and the user interface logic of the application specified for the model in the design time application component through a runtime environment, wherein the runtime application component being platform-independent; and
    linking the model, the design time application component, and the runtime application component to form a pattern module, the pattern module being platform-independent and programming language-independent and including an executable, modifiable, and portable operation of the application, wherein the pattern module further contains a set of interface descriptions that defining parts of different modules and components that can be combined or composed in a canonical manner.

2. A method in accordance with claim 1, further comprising executing the operation according to the pattern module.

3. A method in accordance with claim 1, further comprising storing the pattern module in the knowledge base.

4. A method in accordance with claim 1, further comprising distributing a copy of the pattern module to one or more client systems via an enterprise portal.

5. A method in accordance with claim 1, further comprising:
    receiving a modification to the model; and
    automatically propagating the modification to the design time application component and the runtime application component.

6. A method in accordance with claim 5, further comprising propagating the modification to each copy of the pattern module.

7. A computer program product, tangibly embodied in as a non-transitory information carrier, the computer program product being operable to cause a data processing apparatus to:
    generate, using one or more processors of the data processing apparatus, a graphical representation of a model to represent a basic functional and operational data flow of the application in a storyboard of a visual modeling tool;
    provide, using the one or more processors, a design time application component to provide data content and user interface logic of the application specified for the model, wherein the design time application component uses the data content from a knowledge base accessed through a design time environment;
    provide, using the one or more processors, a runtime application component to execute the data content and the user interface logic of the application specified for the model in the design time application component through a runtime environment, wherein the runtime application component being platform-independent; and
    link, using the one or more processors, the model, the design time application component, and the runtime application component to form a pattern module, the pattern module being platform-independent and programming language-independent and including an executable, modifiable, and portable operation of the application, wherein the pattern module further contains a set of interface descriptions that defining parts of different modules or components that can be combined or composed in a canonical manner.

8. A computer program product in accordance with claim 7, and being further operable to cause a data processing apparatus to execute, using the one or more processors, the operation according to the pattern module.

9. A computer program product in accordance with claim 7, and being further operable to cause a data processing apparatus to store, using the one or more processors, the pattern module in the knowledge base.

10. A computer program product in accordance with claim 7, and being further operable to cause a data processing apparatus to distribute, using the one or more processors, a copy of the pattern module to one or more client systems via an enterprise portal.

11. A computer program product in accordance with claim 7, and being further operable to cause a data processing apparatus to:
receive, using the one or more processors, a modification to the model; and
automatically propagate, using the one or more processors, the modification to the design time application component and the runtime application component.

12. A computer program product in accordance with claim 11, and being further operable to cause a data processing apparatus to propagate the modification to each copy of the pattern module.

13. A system for generating an application based on a selection of one or more application patterns, the system comprising:
one or more computer processors;
a model, implemented by the one or more computer processors, represents a basic functional and operational data flow of the application;
a design time application component, implemented by the one or more computer processors, provides data content and user interface logic of the application specified for the model, wherein the design time application component uses the data content from a knowledge base accessed through a design time environment;
a runtime application component, implemented by the one or more computer processors, executes the data content and the user interface logic of the application specified for the model in the design time application component through a runtime environment, wherein the runtime application component being platform-independent;
a pattern module, implemented by the one or more computer processor, links the model, the design time application component, and the runtime application component, the pattern module being platform-independent and programming language-independent and including an executable, modifiable, and portable operation of the application, wherein the pattern module further links a set of interface descriptions that defining parts of different modules and components that can be combined or composed in a canonical manner; and
a visual modeling tool, implemented by the one or more computer processors, generates a visual representation window to display a graphical representation of the pattern module.

14. A system in accordance with claim 13, further comprising the knowledge base used to store the pattern module and the content for the model.

15. A system in accordance with claim 13, further comprising an enterprise portal implemented by the one or more computer processors to provide distribution of the pattern module to one or more client systems.

16. A system in accordance with claim 15, wherein each of the one or more client systems is connected to the enterprise portal via a communications network.

* * * * *